United States Patent
Hausmann et al.

(10) Patent No.: US 6,833,745 B2
(45) Date of Patent: Dec. 21, 2004

(54) SIGNAL GENERATOR FOR CHARGE PUMP IN AN INTEGRATED CIRCUIT

(75) Inventors: Michael Hausmann, Unterhaching (DE); Joachim Schnabel, Munich (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/426,011

(22) Filed: Apr. 29, 2003

(65) Prior Publication Data

US 2004/0051579 A1 Mar. 18, 2004

(30) Foreign Application Priority Data

Apr. 30, 2002 (DE) .......................................... 102 19 371

(51) Int. Cl.$^7$ .............................................. H03H 11/26
(52) U.S. Cl. ........................................ 327/261; 331/57
(58) Field of Search ................................ 327/261, 269, 327/270, 276; 331/57, 108 C, DIG. 3; 365/222

(56) References Cited

U.S. PATENT DOCUMENTS 5,689,213 A * 11/1997 Sher ............................. 331/57
5,999,009 A * 12/1999 Mitsui .......................... 324/765

* cited by examiner

*Primary Examiner*—Linh My Nguyen
(74) *Attorney, Agent, or Firm*—Fish & Richardson P.C.

(57) ABSTRACT

The invention relates to a signal generating device (10) for a charge pump for an integrated circuit, comprising:

N signal outputs $D_1, \ldots, D_N$ and a signal setting input (12) for setting a frequency f, in which case the signal generating device (10) is designed in such a way that a periodic signal $S_x(t)$ can be output via the signal output $D_x$, all the signals $S_1(t), \ldots, S_N(t)$ have the same settable frequency f, in which case the following holds true for the signal $S_x(t)$, where $2 \leq x \leq N$, $$S_x(t)=S_1(t-(x-1)\cdot\Delta T_x-k_x/(2f)),$$

in which case
  $\Delta T_x$ is the delay duration of the signal $S_x(t)$ with respect to $S_{x-1}(t)$, and
  $k_x \in \{0; 1\}$,
the delay duration $\Delta t_x$ is dependent on the frequency f.

Furthermore, the invention relates to an integrated circuit.

12 Claims, 4 Drawing Sheets

SIGNAL GENERATOR FOR CHARGE PUMP IN AN INTEGRATED CIRCUIT

RELATED APPLICATIONS

This application claims the benefit of the April 30, 2002 filing date of German application DE 102.19.371.1, the contents of which are herein incorporated by reference.

FIELD OF INVENTION

The present invention relates to a signal generating device for a charge pump for an integrated circuit and to an integrated circuit which comprises such a signal generating device.

BACKGROUND

In order, in an integrated circuit and, in particular, a semiconductor memory device or DRAM, to generate voltages which, in respect of magnitude, are higher than the supply voltage or are negative, so-called charge pumps are integrated. Charge pumps make it possible to generate multiples and sums of internal voltages. For this purpose, it is necessary to connect the charge pumps to ring oscillators which provide corresponding frequencies from which are derived control signals which are co-ordinated precisely with respect to time. In certain ranges, the maximum possible output current of the charge pumps is proportional to the oscillator frequency. This means that, in standby operation, i.e. with only a low current requirement, it becomes possible, for power loss reasons, to operate the pumps with lower frequencies than in the active operating mode, in which there is a higher current requirement.

Oscillator devices or arrangements which can generate the required control signals for a charge pump are known.

Such an oscillator arrangement according to the prior art is shown in FIG. 4. A signal with a first frequency f1 is generated in a first ring oscillator 110. A second signal with a frequency f2 is generated in a second ring oscillator 112. In this case, the frequency f2 is different from the frequency f1. The two signals generated are fed to a multiplexer 114, by means of which a selection device 116 can select which of the two signals is output by the multiplexer 114.

The signal output by the multiplexer is fed to a delay chain 118, which generates the control signals for a charge pump 120.

In the delay chain 118, the signal received from the multiplexer 114 is delayed by a predetermined delay duration. The delayed signal is in turn delayed by the predetermined delay duration. This process is repeated until the required number of control signals has been obtained. The signals thus obtained are output to a control signal generating unit 122, which generates control signals for the charge pump 120.

This oscillator arrangement of the prior art has the disadvantage, however, that the control signals are inadequately adapted for the charge pump, which leads to an impairment of the efficiency.

SUMMARY

Consequently, it is an object of the present invention to provide a signal generating device for a charge pump for an integrated circuit and an integrated circuit which enable an improved efficiency during the operation of the charge pump.

The invention provides a signal generating device for a charge pump for an integrated circuit, in which case the signal generating device has N signal outputs $D_1, \ldots, D_N$ and a signal setting input for setting a frequency f and is designed in such a way that a periodic signal $S_x(t)$ can be output via the signal output $D_x$, all the signals $S_1(t), \ldots, S_N(t)$ have the same settable frequency f, in which case the following holds true for the signal $S_x(t)$, where $2 \leq x \leq N$, $$S_x(t) = S_1(t - (x-1) \cdot \Delta T_x - k_x/(2f)),$$

in which case
$\Delta T_x$ is the delay duration of the signal $S_x(t)$ with respect to $S_{x-1}(t)$, and
$k_x \in \{0; 1\}$, the delay duration $\Delta t_x$ is dependent on the frequency f.

The frequency f is preferably the inverse of the period duration of the periodic signal $S_x(t)$. Furthermore, the signal generating device is preferably designed in such a way that all the signals $S_x(t)$ for $2 \leq x \leq N$ satisfy the equation specified above. The delay duration $\Delta T_x$ is preferably inversely proportional to the frequency f. In particular, it is preferred for the delay duration $\Delta T_x$ to increase, the lower the frequency f is.

By virtue of the fact that the delay duration $\Delta T_x$ is dependent on the frequency f, it is possible to ensure that the control signals for the charge pump are in an optimal temporal relationship with one another and the charge pump can thus be operated in an advantageous state for all frequencies.

The signals $S_x(t)$ output all have the same frequency f. Consequently, the temporal sequence of the pulse signals output is the same; in particular, the edges of the signals are spaced apart from one another by the same delay time. However, in a preferred embodiment, it may be provided that the amplitude and/or an offset or a shift of one or more signals is provided.

Preferably, $k_x = (1 + (-1)^x)/2$. Consequently, in each case successive signals are inverted with respect to one another.

The delay duration $\Delta T_x$ is preferably essentially identical, to be precise equal to $\Delta T$, for all the signals $S_2(t), \ldots, S_N(t)$.

In a preferred embodiment, the signal generating device comprises a multiplicity of oscillator stages connected in ring form, in which case the oscillator stages each have an oscillator stage input and an oscillator stage output;

in which case the oscillator stage output is respectively signal-connected to the oscillator stage input of the downstream oscillator stage; and the signal outputs $D_1, \ldots, D_N$ are signal-connected to a respective oscillator stage output of the oscillator stages.

Each oscillator stage preferably has a setting input which is signal-connected to the signal setting input.

By tapping off the signals $S_1, \ldots, S_N$ directly at the oscillator stage outputs, it is possible to obtain the delayed signals directly from the ring oscillator which is used for generating the signal. Consequently, the delay chain which was provided in the prior art can be dispensed with. Furthermore, the multiplexer can likewise be dispensed with since the frequency of the signal generating device according to the invention is variable, and, consequently, only one ring oscillator is required.

Preferably, the oscillator stages each comprise a settable delay element for setting a delay element duration $\tau_{VG}$.

The delay element duration $\tau_{VG}$ forms part of the delay duration $\Delta T_x$.

Preferably, the settable delay element is of capacitive design. It is further preferred that the delay element can be set by means of a setting signal which can be input via the signal setting input.

Preferably, the settable delay element is formed by at least one capacitor, one of whose electrodes is electrically connected to the oscillator stage output and whose other electrode is electrically connected to a fixed potential. The fixed potential is preferably $V_{SS}$, i.e. the potential on the integrated circuit which is provided for "earthing". It is further preferred that the settable delay element may comprise a further capacitor, which can be connected in parallel with the first capacitor by means of the setting signal. The delay element duration $\tau_{VG}$ can be influenced by the size of the capacitance of the delay element.

It is further preferred that the oscillator stages each comprise an inverting element.

The signal generating device preferably comprises N oscillator stages.

In a preferred embodiment, the following holds true for the delay duration $\Delta T=1/(2 \cdot N \cdot f)$, and the following preferably holds true for the signal $S_1(t)=S_N(t-\Delta T)-k_1/(2f))$, where $k_1 \in \{0; 1\}$. Preferably, $k_1=1$.

It is thus particularly preferred that the first signal S1 again follows the last signal $S_N$ and the same delay duration is provided between all the signals.

The invention furthermore provides an integrated circuit which comprises a signal generating device according to the present invention or a preferred embodiment thereof.

BRIEF DESCRIPTION OF THE DRAWING

Further objects, features and advantages of the present invention will become apparent from a detailed description of a preferred embodiment of the present invention with reference to the drawings, in which.

DETAILED DESCRIPTION

Figure 1:
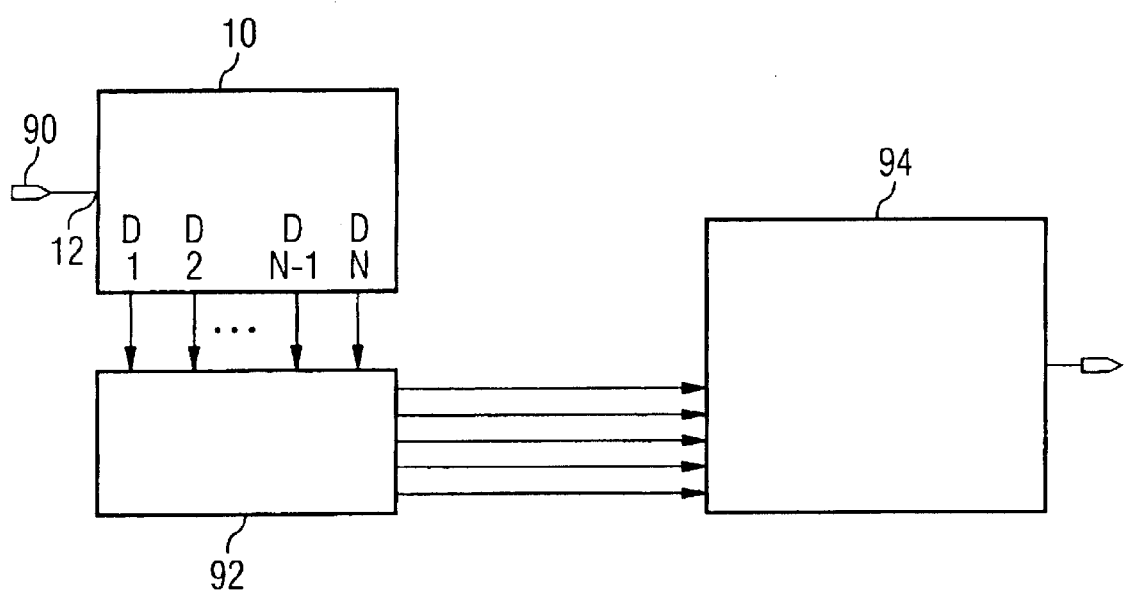
FIG. 1 shows a schematic view of an arrangement of a charge pump and a signal generating device in accordance with a preferred embodiment of the present invention.

FIG. 1 shows a schematic view of a charge pump and a signal generating device in accordance with a preferred embodiment of the invention. The signal generating device 10 according to the invention comprises N signal outputs $D_1, \ldots, D_N$. Furthermore, the signal generating device 10 comprises a signal setting input 12 for setting a frequency f of the signals to be generated. The frequency f may preferably be selected or set by means of a selection device 90, which is provided in the integrated circuit and is signal-connected to the signal setting input 12. As an alternative, the operating mode may be selected by the signal setting input 12. By way of example, a standby mode and a normal mode may be provided. This case is provided in the preferred embodiment of the present invention which is described below.

The outputs $D_1$ to $D_N$ of the signal generating device 10 are preferably connected to a control signal generating unit 92. From the signals output by the signal generating device 10, the control signal generating unit 92 generates signals which are related temporally to one another such that they have an optimum arrangement of the operation of the charge pump 94.

Figure 2:
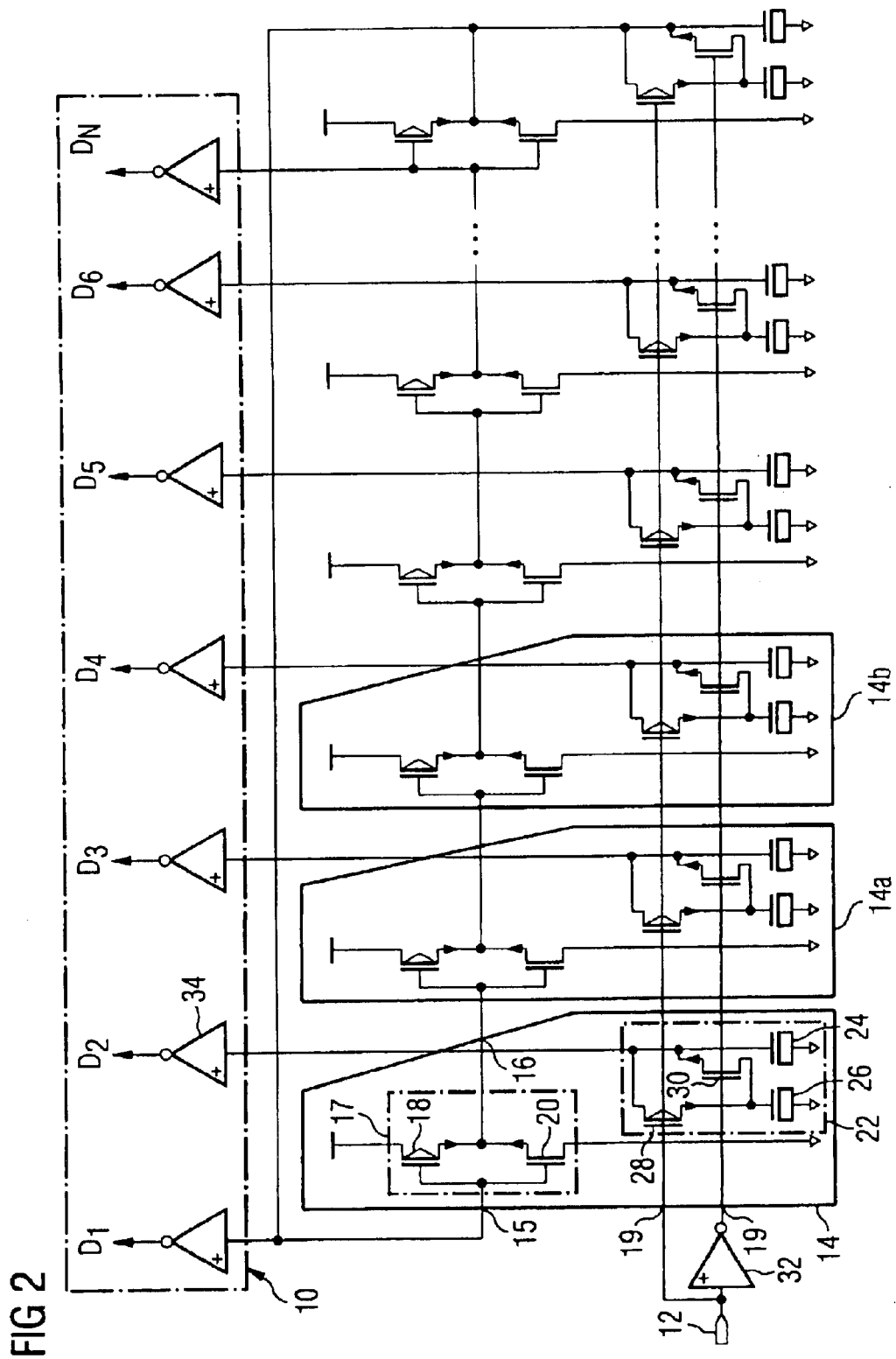
FIG. 2 shows a circuit diagram of a signal generating device in accordance with a preferred embodiment of the present invention.

FIG. 2 shows a circuit diagram of a signal generating device in accordance with a preferred embodiment of the present invention.

The signal generating device in accordance with a preferred embodiment of the present invention comprises a ring oscillator comprising a multiplicity of oscillator stages 14, 14a, 14b, . . . . An odd number of oscillator stages is preferably provided. The oscillator stages 14, 14a, 14b, . . . shown in the embodiment illustrated are preferably all identical. Therefore, only the oscillator stage 14 is described in detail in the description below.

The oscillator stage 14 has an oscillator stage input 15 and an oscillator stage output 16. The oscillator stage output 16 of the oscillator stage 14 is connected to the oscillator stage input 15 of the next oscillator stage; this is the oscillator stage 14a in the embodiment illustrated in FIG. 2. The oscillator stage output 16 of the last oscillator stage 14 (oscillator stage 14 on the far right in FIG. 2) is connected to the oscillator stage input 15 of the first oscillator stage 14 (oscillator stage 14 on the far left in FIG. 2). Furthermore, the oscillator stage 14 has a setting input 19, which is signal-connected to the signal setting input 12.

The oscillator stage 14 comprises an inverting element or an inverter 17, which comprises a p-channel field-effect transistor 18 and an n-channel field-effect transistor 20. During operation, the inverter 17 requires a certain time duration until it has switched. This is the inverter delay duration $\tau_{Inv}$.

Furthermore, the oscillator stage 14 comprises a settable delay element 22 with a settable delay element duration $\tau_{VG}$. In accordance with the preferred embodiment of the present invention, the delay element 22 comprises a first capacitor 24, whose first electrode is electrically connected to the oscillator stage output 16 and whose second electrode is electrically connected to a fixed potential, preferably $V_{SS}$, i.e. the potential on the integrated circuit which is provided for earthing. Furthermore, a second capacitor 26 is provided, whose first electrode is electrically connected to the first electrode of the first capacitor 24 via a p-channel field-effect transistor 28 and an n-channel field-effect transistor 30. The field-effect transistors 28 and 30 can be driven via the signal setting input in such a way that the second capacitor 26 can be connected in parallel with the first capacitor 24. For this purpose, an inverter 32 is furthermore provided. The second electrode of the second capacitor 26 is likewise connected to a fixed potential, preferably the same as the second electrode of the first capacitor. It is furthermore conceivable to design the delay element 22 in any other way as long as the delay element duration $\tau_{VG}$ can be set.

The total delay duration $\Delta T$ of the oscillator stage 14 results from the sum of the inverter delay duration $\tau_{Inv}$ and the delay element duration $\tau_{VG}$ as $\Delta T=\tau_{VG}+\tau_{Inv}$. In accordance with the present embodiment, the delay duration $\Delta T$ of the oscillator stage 14 is identical for all the oscillator stages 14, 14a, 14b, . . . for a specific frequency f. Preferably, $\Delta T=1/(2 \cdot N \cdot f)$. However, it may also be provided that the delay duration $\Delta T$ is different in different oscillator stages for the same frequency f.

A signal output $D_x$ is connected to the oscillator stage output 16 via an inverter 34. As an alternative to the inverter, it is possible to provide a threshold value detector which switches at a predeterminable threshold value, without inverting the incoming signal. However, each oscillator stage output 16 need not necessarily be connected to a signal output $D_x$.

The operation of the signal generating device according to the invention in accordance with a preferred embodiment of the invention is described below with reference to FIGS. 2 and 3. It is assumed here that the ring oscillator is in the steady-state condition, i.e. that a high or low signal is alternately present in each case at the oscillator stage outputs.

A signal generation cycle is described by way of example below. Firstly, it is assumed that a high signal is present at the oscillator stage input 15 of the first oscillator stage 14 and, consequently, as shown in FIG. 3, the signal $S_1$, which is a low signal, is present at the signal output $D_1$. A low signal is then fed to the oscillator stage input 15 of the oscillator stage 14 from the oscillator output of the last oscillator stage of the ring at the instant $t_1$. As a result, the p-channel field-effect transistor 18 is turned on and the n-channel field-effect transistor 20 is turned off. A low signal is still present at the oscillator stage output 16 at this point in time. The capacitor 24 then starts to be charged. The time duration required for the charging state of the capacitor to exceed a predetermined threshold value is the delay element duration $\tau_{VG}$.

If the charging state of the capacitor 24 has exceeded a predetermined threshold value, the inverter 34 outputs a signal $S_2$ with an opposite polarity, i.e. a low signal. This is the instant $t_2$ in FIG. 3. The high signal of the oscillator stage output 16 of the oscillator stage 14 is then also present at the oscillator stage input 17 of the next oscillator stage 14a. Here, the n-channel field-effect transistor 20 is then turned on and the p-channel field-effect transistor 18 is turned off, so that the charged capacitor 24 of the oscillator stage 14a starts to discharge. After the charging state of the capacitor 24 has fallen below a predetermined threshold value, the inverter 34 of the signal output $D_3$ switches and a high signal is output as signal $S_3$. This is the instant $t_3$ in FIG. 3.

Figure 3:
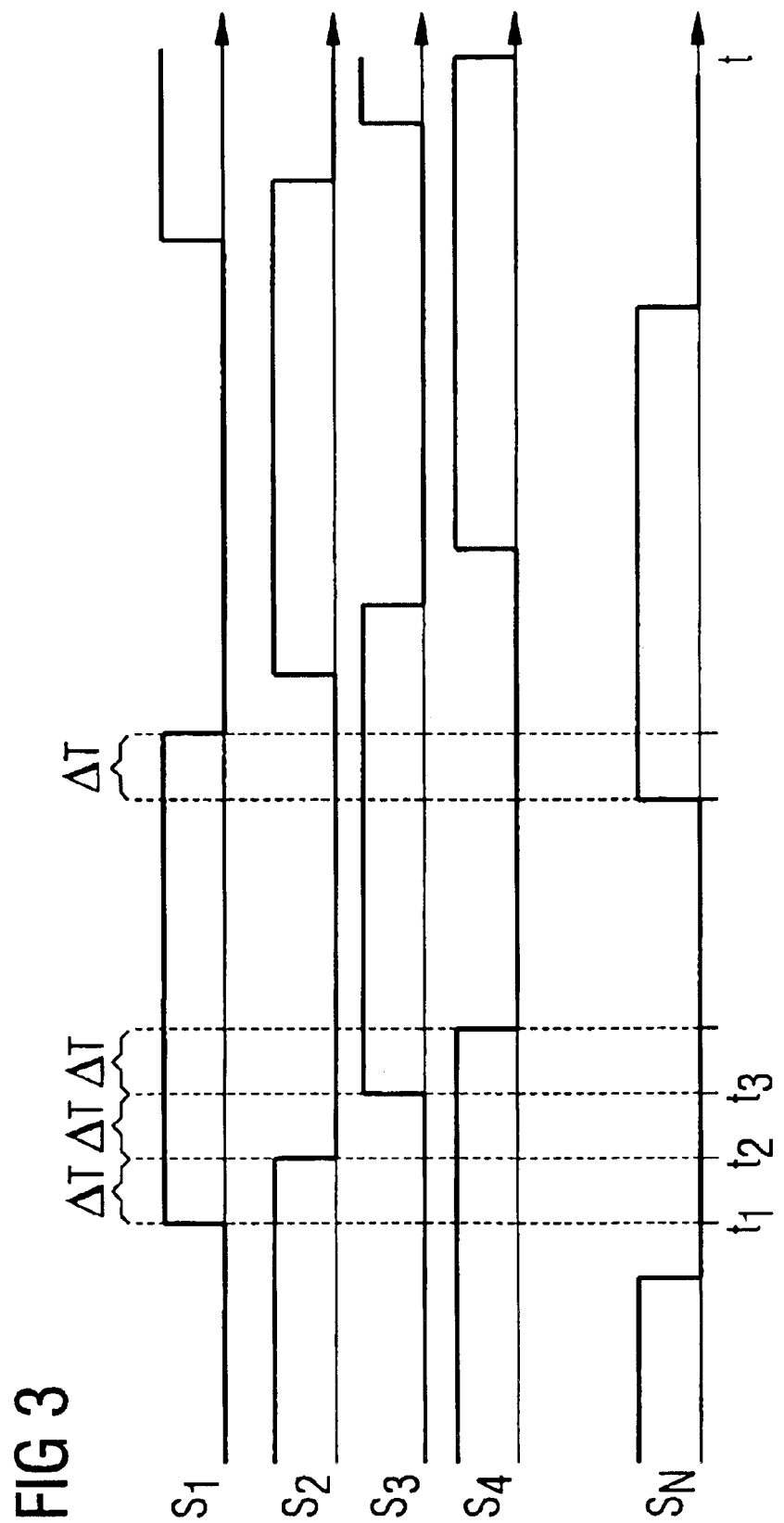
FIG. 3 shows a timing diagram showing signals which have been generated by a signal generating device in accordance with a preferred embodiment of the present invention.
Figure 4:
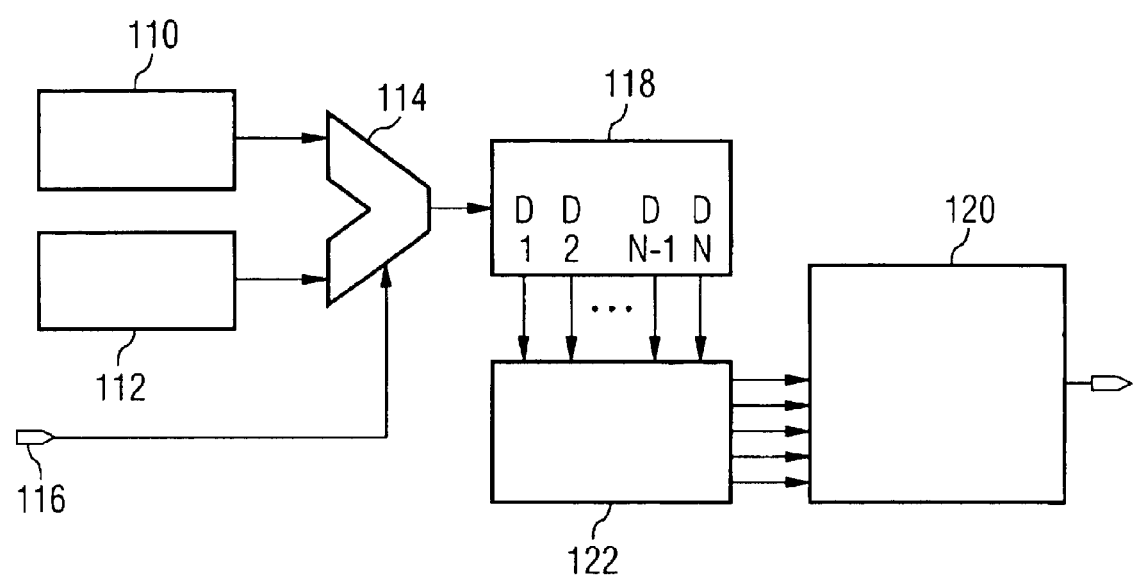
FIG. 4 shows an oscillator arrangement of the prior art.

This process is carried out until the end of the oscillator stage chain shown in FIG. 3. At the end of the oscillator stage chain, a signal is output which is opposite to the signal present at the input of the oscillator stage chain. Consequently, the above process is initiated anew.

A signal $S_x(t)$ where $2 \leq x \leq N$ can thus be expressed as a function of the signal $S_1$ as follows:

$$S_x(t) = S_1(t-(x-1)\cdot \Delta T_x - k_x/(2f)),$$

in which case $\Delta T_x$ is the delay duration of the signal $S_x(t)$ with respect to $s_{x-1}(t)$, and $k_x \in \{0; 1\}$.

In the preferred embodiment of the present invention, $Tx = \Delta T = 1/(2 \cdot N \cdot f)$ and $k_x = (1+(-1)^x)/2$. Consequently, $k_x$ alternately becomes 0 and 1 and two successive signals $S_x(t)$ output are inverted with respect to one another, as shown in FIG. 3. However, it is likewise conceivable to choose $k_x$ in such a way that the signals $S_x$ output are not inverted with respect to one another or only respectively selected signals $S_x$ are inverted. The signal $S_1(t)$ may furthermore be expressed as a function of the signal $S_N$ as follows: $S_1(t) = S_N(t - \Delta T - k_1/(2f))$, where $k_1 \in \{0; 1\}$. Preferably, $k_1 = 1$, so that the signal $S_1(t)$ is shifted by $\Delta T$ with regard to the signal $S_N(t)$ and is inverted with respect to the latter.

The period duration of the signals output is equal to the time required to run through the ring twice, i.e. to generate a high signal and a low signal for a signal $S_x$.

The frequency f can be varied by varying the duration of the charging process and/or discharging process of the capacitor of the delay element 22. For this purpose, the second capacitor 26 can be connected in parallel with the first capacitor 24. In this case, a low signal is fed via the signal setting input 12. The p-channel field-effect transistor 28 is thus turned on. Furthermore, a high signal output by the inverter 32 is present at the n-channel field-effect transistor 26, so that the latter is likewise turned on. This results in a parallel circuit of the capacitors 24 and 26.

The resulting capacitance is the sum of the capacitances of the two capacitors 24, 26. The time required to charge this resulting capacitance, and hence the delay time $\tau_{VG}$, is greater than the charging time with only one capacitor. As a consequence, the time required to run through all the oscillator stages of the ring oscillator once is longer, and thus so is the period duration 1/f of the signals output.

List of Reference Symbols

| | |
|---|---|
| 10 | Signal generating device |
| 12 | Signal setting input |
| 14 | Oscillator stages |
| 15 | Oscillator stage input |
| 16 | Oscillator stage output |
| 17 | Inverter |
| 18 | p-Channel field-effect transistor |
| 19 | Setting input |
| 20 | n-Channel field-effect transistor |
| 22 | Delay element |
| 24 | First capacitor |
| 26 | Second capacitor |
| 28 | p-Channel field-effect transistor |
| 30 | n-Channel field-effect transistor |
| 32 | Inverter |
| 34 | Inverter |
| 90 | Selection device |
| 92 | Control signal generating unit |
| 94 | Charge pump |
| 110 | Ring oscillator |
| 112 | Ring oscillator |
| 114 | Multiplexer |
| 116 | Selection device |
| 118 | Delay chain |
| 120 | Charge pump |
| 122 | Control signal generating unit |
| $D_1, \ldots, D_n$ | Signal outputs |

What is claimed is:

1. A signal generating device for a charge pump for an integrated circuit, the signal generating device having N signal outputs $D_1, \ldots, D_N$ and a signal setting input for setting a frequency f such that:

a periodic signal $S_x(t)$ can be output via the signal output $D_x$;

all the signals $S_1(t), \ldots, S_N(t)$ have the same settable frequency f; and for x within an interval $2 \leq x \leq N$, $S_x(t) = S_1(t-(x-1)\cdot \Delta T_x - k_x/(2f))$ wherein $\Delta T_x$ is a frequency-dependent delay duration of the signal $S_x(t)$ with respect to $S_{x-1}(t)$, and $k_x \in \{0; 1\}$.

2. The signal generating device according to claim 1, wherein $k_x = (1+(-1)^x)/2$.

3. The signal generating device according to claim 1, wherein the delay duration $\Delta T_x$ is equal to $\Delta T$ for all the signals $S_2(t), \ldots, S_N(t)$.

4. The signal generating device according to claim 1, further comprising a multiplicity of oscillator stages connected in a ring, the oscillator stages each having an oscillator stage input and an oscillator stage output;

each oscillator stage output being respectively signal-connected to an oscillator stage input of a downstream oscillator stage; and the signal outputs $D_1, \ldots, D_N$ being signal-connected to a respective oscillator stage output of the oscillator stages.

5. The signal generating device according to claim 4, wherein the oscillator stages each comprise a settable delay element for setting a delay element duration $\tau_{VG}$.

6. The signal generating device according to claim 5, wherein the settable delay element is of capacitive design.

7. The signal generating device according to claim 5, wherein the delay element is set by a setting signal that is input via the signal setting input.

8. The signal generating device according to claim 4, wherein the oscillator stages each comprise an inverting element.

9. The signal generating device according to claim 4, wherein the number of oscillator stages is equal to the number of signal outputs.

10. The signal generating device according to claim 3, wherein the delay duration $\Delta T$ is given by $\Delta T=1/(2 \cdot N \cdot f)$.

11. The signal generating device according to claim 10, wherein the signal $S_1(t)$ is given by $S_1(t)=S_N(t-\Delta t-k_1/(2f))$, where $k_1 \in \{0; 1\}$.

12. An integrated circuit comprising a signal generating device according to claim 1.

* * * * *